United States Patent [19]

Takida et al.

[11] Patent Number: 4,786,685
[45] Date of Patent: Nov. 22, 1988

[54] THERMOPLASTIC RESIN COMPOSITION

[75] Inventors: Hiroshi Takida; Kenji Hasegawa, both of Takatsuki; Teruo Iwanami, Ibaraki, all of Japan

[73] Assignee: Nippon Gohsei Kagaku Kogyo Kabushiki Kaisha, Osaka, Japan

[21] Appl. No.: 79,112

[22] Filed: Jul. 29, 1987

[30] Foreign Application Priority Data

Aug. 1, 1986 [JP] Japan ................................ 61-182456
Jan. 9, 1987 [JP] Japan .................................... 62-3790

[51] Int. Cl.$^4$ ............................................. C08L 29/04
[52] U.S. Cl. ....................................... 525/58; 525/56; 525/148
[58] Field of Search ..................... 525/58, 148, 56, 468

[56] References Cited

U.S. PATENT DOCUMENTS 3,887,649 6/1975 Takida et al. ........................... 525/58
4,579,910 4/1986 Giles, Jr. et al. .................... 525/148
4,611,029 9/1986 Takahashi .............................. 525/61

FOREIGN PATENT DOCUMENTS 0019438 11/1980 European Pat. Off. .
0165383 12/1985 European Pat. Off. .
0188792 7/1986 European Pat. Off. .
1441071 6/1976 United Kingdom .

Primary Examiner—Theodore E. Pertilla
Attorney, Agent, or Firm—Antonelli, Terry & Wands

[57] ABSTRACT

A thermoplastic resin composition comprising
(1) a thermoplastic resin having an ester structure in the main chain and
(2) a hydrolyzed ethylene-vinyl acetate copolymer having an ethylene content of 20 to 60% by mole and a degree of hydrolysis in the vinyl acetate component of at least 95% by mole, and having an ash content of not more than 20 ppm and an alkali metal content of not more than 5 ppm. The composition of the present invention can give molded articles having excellent properties, and is suitable for use as wrapping or packaging materials and engineering plastics.

8 Claims, No Drawings

THERMOPLASTIC RESIN COMPOSITION

BACKGROUND OF THE INVENTION

The present invention relates to a thermoplastic resin compositon, and more particularly to a compositon of a thermoplastic resin such as a polycarbonate or a polyester suitable for use as wrapping or packaging materials e.g. a film or a sheet, containers e.g. a bottle or engineering plastics, which has improved heat stability or improved mechnical properties.

Polycarbonates and polyesters have been practically used as wrapping or packaging materials of products requiring oxygen impermeability such as a food, or as engineering plastics such as parts of machines and tools or parts of electric machines or appliances.

The polycarbonates and polyesters have respectively characteristic and excellent properties, but there are conducted various improvements of the above thermoplastic resins in the recent requirement of technological progress to higher performance.

For instance, it is attempted to blend thermoplastic resins with various fillers, fluorocarbon resins, molybdenum sulfide, or mineral oils. However, in the attempt, the processability and the surface appearance of the molded articles are lowered and there are exhibited the coloring of the molded articles and the bleeding of additives, and moreover, in certain cases, the mechanical properties of the thermoplastic resin itself are exerted bad influence.

Also, it is attempted to blend the thermoplastic resin with a hydrolyzed ethylene-vinyl acetate copolymer for improving oxygen impermeability, adhesive strength between layers on preparation of multilayers and mechanical and electric properties. However, the composition of the thermoplastic resin and the hydrolyzed ethylene-vinyl acetate copolymer has a defect that it is difficult to improve sufficiently the mechanical strength such as the impact resistance, and for extending the use of the thermoplastic resin composition, the above defect must be solved.

The cause that the mechanical properties are lowered is considered that polyesters or polycarbonates have the poor thermal stability in the presence of a slight amount of water at high temperature on melt-molding and they are partially decomposed by impurities in a hydrolyzed ethylene-vinyl acetate copolymer, particularly an alkali component, thus resulting in lowering of the surface appearance or the deterioration of the mechanical strength such as impact strength.

An object of the present invention is to provide a thermoplastic resin composition excellent in the thermal stability.

Another object of the present invention is to provide a thermoplastic resin composition capable of giving molded articles having improved surface properties without impairing the processability and the mechanical strength existing in the thermoplastic resin itself.

The above and other objects of the present invention will become apparent from the description hereafter.

SUMMARY OF THE INVENTION

According to the present invention, there is provided a thermoplastic resin composition comprising
(1) a thermoplastic resin having an ester structure in the main chain and
(2) a hydrolyzed ethylene-vinyl acetate copolymer having an ethylene content of 20 to 60% by mole and a degree of hydrolysis in the vinyl acetate component of at least 95% by mole, and having an ash content of not more than 20 ppm and an alkali metal content of not more than 5 ppm.

DETAILED DESCRIPTION

The characteristic of the present invention is to use a hydrolyzed ethylene-vinyl acetate copolymer having a remarkably slight amount of an ash content and an alkali metal content.

In the present invention, there is used a thermoplastic resin having an ester structure in its main chain. Examples of the thermoplastic resins are, for instance, polycarbonates, polyethylene terephthalates, polybutylne terephthalates, polyester-polycarbonates, and the like.

Polycarbonates are generally prepared by the reaction of a bivalent phenol with phosgene in the presence of an acid acceptor and a molecular weight modifier, or the interesterification of a bivalent phenol with a diphenyl carbonate. As the bivalent phenol, bisphenol A is prefered. Also, the bisphenol A may be partially or completely substituted by other bivalent phenol. The polycarbonate may be partially branched, e.g., there can be used a thermoplastic random branched polycarbonate prepared by the reaction of a polyfunctional aromatic compound with the bivalent phenol.

Polyethylene terephthalates are prepared by the polycondensation of terephthalic acid or dimethyl terephthalate with ethylene glycol. The ethylene glycol may be partially substituted by other glycol such as cyclohexanedimethanol.

Polybutylene terephthalates are prepared by any methods, e.g. the polycondensation of bis-($\omega$-hydroxybutyl)-terephthalate obtained by the interesterification of dimethyl terephthalate with 1,4-butanediol, the polycondensation of terephthalic acid with 1,4-butanediol, the polycondensation of a reaction product of the interesterification of terephthalic acid or dimethyl terephthalate with 1,4-diacetoxybutane, and the like.

As the thermoplastic resin (1), a polyester-polycarbonate can be used. The polyester-polycarbonate can be prepared, for instance, according to a solution polymerization method in which a dihydroxydiaryl compound such as bisphenol A is reacted with terephthaloyl chloride in an organic solvent such as methylene chloride in the presence of a acid acceptor such as pyridine and then the obtained reaction product is polycondensed with phosgen, an interfacial polymerization method in which an alkaline aqueous solution of the dihydroxydiaryl compound is reacted with a solution of terephthaloyl chloride in an organic solvent, with which phosgen is reacted to give an oligomer having chloroformate group in its molecular ends and the polycondensation is conductd by adding the alkaline aqueous solution of the dihydroxydiaryl compound.

The feature of the present invention is, as aforementioned, that the hydrolyzed ethylene-vinyl acetate copolymer having the ash content of not more than 20 ppm and the alkali metal content of not more than 5 ppm is employed. That is,usually, the hydrolyzed copolymer is prepared by hydrolyzing an ethylene-vinyl acetate copolymer with an alkaline catalyst. After hydrolysis reaction, polyvalent metal salts from industrial water or reagents and an acetate of alkali metal from catalyst is contained as impurities in the hydrolyzed copolymer. In the present invention, the thermal stability and surface property of the thermoplastic resin are improved by removing the metal salts from the hydrolyzed copolymer as much as possible.

The term "ash" used herein means a residue obtained by placing the hydrolyzed ethylene-vinyl acetate copolymer dried on a platinum evaporating dish, carbonizing it by using a heater and a gas burner, placing the carbonized hydrolyzed copolymer in an electric furnace having a temperature of 400° C., gradually elevating the temperature of the furnace to 700° C., completely laying the carbonized copolymer in ashes by heating at 700° C. for 3 hours, allowing the resulting ash of copolymer to cool for 5 minutes after taking out from the furnace, and allowing it to stand for 25 minutes in a desiccator. The amount of the thus obtained ashes are accurately determined and it shows as an ash content. In the present invention, it is necessary that the ash content is not more than 20 ppm, and it is preferable that the content is not more than 10 ppm. When the ash content is more than 20 ppm, the mechanical strength of the obtained molded article is largely lowered and the surface appearance of the molded article is largely deteriorated. Generally, the hydolyzed copolymer of the invention has the ash content of 1 to 20 ppm.

In the present invention, it is necessary that the alkali metal content is not more than 5 ppm, and it is preferable the content is not more than 3 ppm. When the alkali metal content is more than 5 ppm, the properties of the molded article are deteriorated. Generally, the hydrolyzed copolymer of the invention has the alkali metal content of 0.5 to 5 ppm. The alkali metal content is determined according to atomic absorption analysis of an aqueous hydrochloric acid solution of the ashes, the solution being obtained by dissolving the ashes obtained in the same manner as above in an aqueous solution of hydrochloric acid with heating.

In the present invention, the powder, particles or pellets (hereinafter referred to as "the powder and the like") of the hydrolyzed ethylene-vinyl acetate copolymer are thoroughly washed with an aqueous solution of an acid, preferably a weak acid, to remove the salts which causes to generation of the ashes and the alkali metal in the hydrolyzed copolymer. Then, it is desirable that the powder and the like washed with the aqueous solution of the acid are further washed with water to remove the acid attached to the powder and the like. Thus, the hydrolyzed copolymer of the present invention can be obtained by washing the hydrolyzed copolymer with the aqueous solution of the acid, and, desirably, further washing the copolymer with water, and drying.

Examples of the acids are, for instance, acetic acid, propionic acid, glycollic acid, lactic acid, adipic acid, azelaic acid, glutaric acid, succinic acid, benzoic acid, isophthalic acid, terephthalic acid, and the like. An acid having a pKa (25° C. ) of not less than 3.5 is preferably used.

After completing the above mentioned weak acid treatment, the hydrolyzed copolymer is further treated with an aqueous solution of a strong acid after or before washing with water. The washing with the dilute aqueous solution of the strong acid is prefered, since it is possible to efficiently remove the alkali metal. Examples of the strong acids are, for instance, an organic acid having a pKa (25° C. ) of not more than 2.5 such as oxalic acid or maleic acid, an inorganic acid such as phosphoric acid, sulfuric acid, nitric acid or hydrochloric acid, and the like.

The hydrolyzed ethylene-vinyl acetate copolymer used in the present invention has an ethylene content of 20 to 60% by mole, preferably 25 to 55% by mole, and has a degree of hydrolysis in the vinyl acetate component of at least 95% by mole. When the ethylene content is below 20% by mole, the compatibiliy with the thermoplastic resin (1) is lowered, on the other hand, when the ethylene content is over 60% by mole, the effect for improving the surface properties or the thermal stability are lowered. When the degree of hydrolysis is below 95% by mole, the thermal stability and the moisture resistance are lowered.

The hydrolyzed copolymer used in the invention may include a small amount of comonomers, e.g. α-olefins such as propylene, iso-butene, α-octene, αo-dodecene and α-octadecene; an unsaturated carboxylic acids, their salts, partial or complete alkyl esters, nitriles, amides and anhydrides; and unsaturated sulfonic acid and their salts.

The amount of the hydrolyzed ethylene-vinyl acetate copolymer (2) is not particularly limited. Preferably, the amount of the copolymer (2) is from 0.1 to 25 parts by weight per 100 parts by weight of the thermoplastic resin (1). When the amount of the component (2) is less than 0.1 part by weight per 100 parts of the thermoplastic resin, the effect exhibited by mixing the hydrolyzed ethylene-vinyl acetate copolymer is hard to be obtained. On the other hand, when the amount is more than 25 parts by weight, properties of the thermoplastic resin are impaired, e.g. transparency which is important when formed into sheets, films and bottles. The thermal stability is remarkably excellent around the lowest limit of the hydrolyzed ethylene-vinyl acetate copolymer. On the other hand, the more the amount of the hydrolyzed ethylene-vinyl acetate copolymer added, the better the surface properties.

The composition of the component (1) and the component (2) is subjected to a melt molding to prepare desired molded articles having any shapes such as pellet, film, sheet, container, rod and tube.

There are applicable an injection molding, an extrusion molding, a rotational molding, a fluidized bed molding, a blow molding and the like to melt molding of the composition. The composition can be molded under the similar conditions to those of molding of the thermoplastic resin alone. The molding temperature depends on the kinds of the thermoplastic resin, and it is generally preferable that the temperature is from 200° to 320° C.

Also, there can be molded the mixture of two or more kinds of the hydrolyzed ethylene-vinyl acetate copolymers different from each other in an ethylene content or a degree of hydrolysis with the thermoplastic resin (1). In case of melt-molding, usual additives can be admixed in a suitable amount to the composition. Examples of the additives are, for instance, plasticizers such as polyhydric alcohol, stabilizers, surfactants, cross-linking agents such as epoxy compounds, polyvalent metal salts and organic or inorganic polybasic acids and their salts, fillers, coloring agents, fibers used as reinforcement (glass fibers, carbon fibers, and the like), and the like. Also, other thermoplastic resins may be admixed in a suitable amount to the composition. Examples of the other thermoplastic resins are, for instance, polyolefins, polyamide, polyvinyl chloride, polyvinylidene chloride, polystyrene, ABS, polyurethane, polyacetate and the like. It is possible to produce not only the extruded article of single layer from the composition, but also the coextruded article of multilayer from the composition with other thermoplastic resins.

Examples of the other thermoplastic resins in the coextrusion with the composition of the invention are, for instance, polyolefins such as a low density polyethylene, a medium density polyethylene, a high density polyethylene, a copolymer of ethylene and vinyl acetate, ionomer, a copolymer of ethylene and acrylic ester, polypropylene, a copolymer of propylene and α-olefin having 4 to 20 carbon atoms, and a homopolymer or copolymer of olefin such as polybutene or polypentene, or their modified homopolymer or copolymer of olefin prepared by grafting with an unsaturated carboxylic acid or ester thereof; a polyester, a polyamide, a copolyamide, a polyvinyl chloride, polyvinylidene chloride, an acrylic resin, a styrenic resin, a vinyl ester resin, a polyester elastmer, a polyurethane elastmer, a chlorinated polyethylene, a chlorinated polypropylene, a hydrolyzed ethylene-vinyl acetate copolymer; and the like.

Furthermore, it is possible to extrusion-coat with other thermoplastic resins such as a polyolefin on the surface of the molded articles such as films or sheets obtained from the composition of the present invention. Also, molded articles such as film or sheet obtained from the composition of the invention can be dry-laminated on any other materials such as paper, metal foil, stretched or unstretched plastic film or sheet, fabric, non-woven fabric and wood by using an adhesive.

After melt-molding, the obtained extrudates, coextrudates, or melt-coated articles may be, if necessary, subjected to an after-treatment such as heat treatment, cooling treatment, uniaxial stretching, biaxial stretching, printing, dry laminating, solution coating, melt-coating, bag making, deep drawing, box making, tube making, splitting, and the like.

The molded articles obtained from the composition of the present invention are useful for various uses including packaging materials for foods, industrial chemical reagents, and agricultural chemicals, parts of general machines and tools, parts of automobiles, ships and airplanes, parts of optical instruments or clocks, parts of electric machines or appliances, building materials, daily necessaries, and the like.

The present invention is more specifically described and explained by means of the following Examples in which all percents and parts are by weight unless otherwise noted. It is to be understood tht the present invention is not limited to the Examples, and various changes and modifications may be made in the invention without departing from the spirit and scope thereof.

REFERENCE EXAMPLE 1

A pressure reactor was charged with 1,000 parts of a 40% methanol solution of ethylene-vinyl acetate copolymer having an ethylene content of 40% by mole and heated to 110° C. with stirring. Then, the hydrolysis reaction was carried out for 2.5 hours by continuously adding 40 parts of a 6% methanol solution of sodium hydroxide and 2,500 parts of methanol to the pressure reactor with removing methyl acetate produced as a by-product and excess methanol from the reaction system to give a hydrolyzed ethylene-vinyl acetate copolymer having a degree of hydrolysis in vinyl acetate component of 99.0% by mole.

After completing the hydrolysis reaction, the pressure reactor was charged with 450 parts of a mixture of methanol and water (methanol:water=7:3) under distilling away excess methanol, and methanol solution containing water (water:methanol=3:7) having a resin content of 39% was prepared.

The obtained solution of the hydrolyzed ethylene-vinyl acetate copolymer in the mixture of methanol and water having a temperature of 50° C. was extruded through a nozzle (hole diameter: 4 mm) at a rate of 1.5 liters/hour into a coagulating bath having a mixture of water and methanol (water:methanol=9:1) (width: 100 mm, length: 4,000 mm, height: 100 mm) maintained at a temperature of 5° C. in the form of strand. After completing the coagulation, the strand was passed through a wind-up roller (line speed: 2 m/minute) equipped at the end portion of the coagulating bath, was cut by a cutter to prepare white porous pettlets having a diameter of 4 mm and a length of 4 mm. The hydrolyzed ethylene-vinyl acetate copolymer had an ash content of 7,400 ppm and a sodium metal content of 4,800 ppm.

Then, 100 parts of the obtained pellets were washed by dipping in 300 parts of a 0.3% aqueous solution of acetic acid and stirring at 30° C. for 1 hour. After repeating the above washing twice, the slurry was filtered off. The obtained pellets were washed by mixing with 300 parts of water to give a slurry and stirring the slurry at 30° C. for 1 hour. After repeating the washing three times, the slurry was filtered off and dried.

Thus obtained hydrolzed ethylene-vinyl acetate copolymer [I] had a degree of hydrolysis of 99.0% by mole, an ash content of 6 ppm and a sodium metal content of 2.7 ppm.

REFERENCE EXAMPLE 2

The procedure of Reference Example 1 was repeated except that, before washing with water, pellets were washed by dipping in 230 parts of a 0.003% aqueous solution of phosphoric acid and stirring at 30° C. for 1 hour to give pellets of hydrolyzed copolymer. The obtained hydrolyzed ethylene-vinyl acetate copolymer [II] had an ash content of 10 ppm and a sodium metal content of 1.4 ppm.

REFERENCE EXAMPLE 3

A hydrolyzed ethylene-vinyl acetate copolymer [III] having an ash content of 30 ppm and a sodium metal content of 10 ppm was prepared in the same manner as in Reference Example 1 except that the obtained pellets were washed with a 0.15% aqueous solution of acetic acid.

Ash content and sodium metal content were measured as follows:

[Ash Content]

There is exactly determined about 80 g of a dried sample of the hydrolyzed copolymer, and about 10 g of the sample is placed on a platinum evaporating dish reached to constant weight and carbonized by using an electric heater. After carbonizing about 10 g of the sample, about 10 g of the other sample is placed on the evaporating dish and carbonized in the same manner as above. The above procedure is repeated until all of the sample is carbonized. At last the sample on the dish is burned by heating with a gas burner until not giving out smoke. The evaporating dish is put into an electric furnace having a temperature of about 400° C., covered nearly all the dish with a cover of a porcelain crucible and the temperature of the furnace is gradually risen to 700° C. After completing the ashing by maintaining the temperature at 700° C. for 3 hours, the dish is taken out from the electric furnace. The dish is allowed to cool for 5 minutes and is allowed to stand in a desiccator for 25 minutes. The obtained ashes are exactly determined.

[Sodium metal content]

There is exactly determined about 10 g of a dried sample of the hydrolyzed copolymer and is charged in a platinum crucible. The ashing is conducted in the same manner as above. The platinum crucible is charged with 2 ml of guaranteed hydrochloric acid (which is prescribed in Japanese Industrial Standard) and 3 ml of pure water and the ashes are dissolved by heating with an electric heater. The obtained solution is poured into a 50 ml messflask with pure water and pure water is added to the flask to its indicator to prepare a sample for atomic absorption analysis.

A standard solution for atomic absorption analysis (sodium metal: 1 ppm, hydrochloric acid: about 0.5N) is separately prepared. Sodium metal content is determined by measurement of an absorbance ratio of an absorbance of sample solution to an absorbance of standard solution. Measuring conditions are as follows:
Apparatus: Hitachi 180-30 atomic absorption/flame spectrophotometer commercialy available from Hitachi, Ltd.
Wave length: 589.0 nm.
Flame: acetylene-air.

EXAMPLES 1 TO 6 AND COMPARATIVE EXAMPLES 1 to 6

A composition of a thermoplastic resin and a hydrolyzed ethylene-vinyl acetate copolymer having a mixing ratio shown in Table 1 was subjected to injection molding at a temperature shown in Table 1.

The properties of the obtained molded article are shown in Table 1.

Surface hardness, abrasion resistance and impact strength were measured as follows:
Surface hardness: Rockwell hardness (scale M) is measured according to American Society for Testing Materials (ASTM) D 785.
Abrasion resistance: Taber's abrasion (wearing wheel: CS-17, load: 1 kg, 1,000 revolutions) according to ASTM D 1175.
Impact strength: Izod impact strength with notch is measured according to ASTM D 256 (provided that the thickness of a test piece of polycarbonate is $\frac{1}{8}$").

In regard to the surface appearance of the molded articles, it is confirmed that the molded articles made from the thermoplastic resin alone or the composition of the invention (Examples 1 to 6) have excellent smoothness and a flow mark and change of color are not observed on the surfaces. On the other hand, in Comparative Examples 1 to 6, flushing and change of color occur on the surface of the molded articles.

TABLE 1

|  | Thermoplastic resin (1) | Hydrolyzed ethylene-vinyl acetate copolymer (2) | Blending ratio of (1)/(2) | Injection molding temperature (°C.) | Rockwell hardness (M) | Abrasion resistance (mg) | Impact Strength (kg · cm/cm) |
| --- | --- | --- | --- | --- | --- | --- | --- |
| Ex. 1 | Polycarbonate*[1] | [I] | 95/5 | 280 | 93 | 9 | 80 |
| Ex. 2 | " | [II] | 90/10 | " | 95 | 8 | 75 |
| Com. Ex. 1 | " | — | — | 280 | 75 | 13 | 80 |
| Com. Ex. 2 | " | [III] | 95/5 | " | 92 | 10 | 55 |
| Ex. 3 | Polybutylene terephthalate*[2] | [I] | 85/15 | 245 | 95 | 8 | 4.4 |
| Ex. 4 | " | [II] | 80/20 | " | 97 | 7 | 4.0 |
| Com. Ex. 3 | " | — | — | 245 | 72 | 12 | 4.5 |
| Com. Ex. 4 | " | [III] | 85/15 | " | 93 | 9 | 3.0 |
| Ex. 5 | Polyethylene terephthalate*[3] | [I] | 95/5 | 300 | 100 | 12 | 3.5 |
| Ex. 6 | " | [II] | 80/20 | " | 100 | 7 | 3.0 |
| Com. Ex. 5 | " | — | — | 300 | 98 | 25 | 3.5 |
| Com. Ex. 6 | " | [III] | 95/5 | " | 100 | 14 | 2.0 |

(Notes):
*[1]"Iupilon S-1000" made by Mitsubishi Gas Chemical Co., Inc. (Melting point: 250° C.)
*[2]"RT 580" made by NIPPON UNIPET Co., Ltd. (Melting point: 254° C.)
*[3]"VALOX 310" made by General Electric Co. (Melting point: 232° C.)

EXAMPLES 7 TO 12 AND COMPARATIVE EXAMPLES 7 TO 12

The composition of a thermoplastic resin and a hydrolyzed ethylene-vinyl acetate copolymer having a blending ratio shown in Table 2 was subjected to melt molding under conditions shown in Tables 3 and 4.

The properties of the obtained molded articles are shown in Table 2.

Impact strength and transparency were measured as follows:
Impact strength: (measured by using injection molded articles). Izod impact strength with notch is measured according to ASTM D 256 (provided that the thickness of test piece of polycarbonate is $\frac{1}{8}$").
Transparency: (measured by using extruson molded articles). Transparency is measured according to ASTM D 1003 using a film having a thickness of 50µ with a hazemeter.

TABLE 2

|  | Thermoplastic resin (1) | Hydrolyzed ethylene-vinyl acetate copolymer (2) | Blending ratio of (1)/(2) | Impact Strength (kg · cm/cm) | Transparency haze value (%) |
| --- | --- | --- | --- | --- | --- |
| Ex. 7 | Polycarbonate*[1] | [I] | 99.5/0.5 | 100 | 1.5 |

TABLE 2-continued

| | Thermoplastic resin (1) | Hydrolyzed ethylene-vinyl acetate copolymer (2) | Blending ratio of (1)/(2) | Impact Strength (kg · cm/cm) | Transparency haze value (%) |
|---|---|---|---|---|---|
| Ex. 8 | " | [II] | 99.7/0.3 | 90 | 1.3 |
| Com. Ex. 7 | " | — | — | 80 | 1.3 |
| Com. Ex. 8 | " | [III] | 99.5/0.5 | 70 | 2.8 |
| Ex. 9 | Polybutylene terephthalate*2 | [I] | 99.5/0.5 | 6.0 | 5.4 |
| Ex. 10 | " | [II] | 99.7/0.3 | 5.5 | 5.2 |
| Com. Ex. 9 | " | — | — | 4.5 | 5.2 |
| Com. Ex. 10 | " | [III] | 99.5/0.5 | 4.2 | 6.3 |
| Ex. 11 | Polyethylene terephthalate*3 | [I] | 99.5/0.5 | 5.3 | 3.5 |
| Ex. 12 | " | [II] | 99.7/0.3 | 4.5 | 3.5 |
| Com. Ex. 11 | " | — | — | 3.5 | 3.5 |
| Com. Ex. 12 | " | [III] | 99.5/0.5 | 2.6 | 4.4 |

(Notes):
*1"Iupilon S-1000" made by Mitsubishi Gas Chemical Co., Inc. (Melting point: 250° C.)
*2"RT 533" made by NIPPON UNIPET Co., Ltd. (Melting point: 255° C.)
*3"VALOX 310" made by General Electric Co. (Melting point: 232° C.)

TABLE 3

| | Conditions of the injection molding | | |
|---|---|---|---|
| | Temperature at a feed end of a cylinder (°C.) | Temperature at a discharge end of a cylinder (°C.) | Temperature of a nozzle (°C.) |
| Ex. 7 and 8 Com. Ex. 7 and 8 | 260 | 285 | 280 |
| Ex. 9 and 10 Com. Ex. 9 and 10 | 245 | 265 | 255 |
| Ex. 11 and 12 Com. Ex. 11 and 12 | 260 | 280 | 275 |

Molding machine: Inline screw type injection molding machine (5 ounces)
Injection pressure: 900 kg/cm$^2$
Injection time: 10 seconds
Temperature of a mold: 50° C.
Cooling time: 20 seconds

TABLE 4

| | Conditions of the extrusion molding |
|---|---|
| | Temperatures of a cylinder and a die |
| Ex. 7 and 8 Com. Ex. 7 and 8 | 270° C. |
| Ex. 9 and 10 Com. Ex. 9 and 10 | 250° C. |
| Ex. 11 and 12 Com. Ex. 11 and 12 | 270° C. |

Molding machine: Uniaxial extruder having a screw diameter of 45 mm and a width of T die of 450 mm
Temperature of roll: 30° C.
Speed of winding-up: 5 m/minute As aforementioned, the composition of the present invention can give molded articles having excellent properties, and is suitable for use as wrapping or packaging materials and engineering plastics.

In addition to the ingredients used in the Examples, other ingredients can be used in the Examples as set forth in the specification to obtain substantially the same results.

What we claim is:

1. A thermoplastic resin composition comprising (1) a thermoplastic resin having an ester structure in the main chain and being selected from the group consisting of a polycarbonate, a polyethylene terephthalate, a polybutylene terephthalate, and a polyester-polycarbonate other than said polycarbonate, and (2) a hydrolyzed ethylene-vinyl acetate copolymer having an ethylene content of 20 to 60% by mole and a degree of hydrolysis in the vinyl acetate component of at least 95% by mole, and having an ash content of not more than 20 ppm and an alkali metal content of not more than 5 ppm.

2. The composition of claim 1, wherein said hydrolyzed copolymer has an ash content of not more than 10 ppm.

3. The composition of claim 1, which said hydrolyzed copolymer has an alkali metal content of not more than 3 ppm.

4. The composition of claim 1, wherein an amount of said component (2) is 0.1 to 25 parts by weight per 100 parts by weight of said component (1).

5. A composition of claim 1, wherein the thermoplastic resin is a polycarbonate.

6. A composition of claim 1, wherein the thermoplastic resin is polyethylene terephthalate.

7. A composition of claim 1, wherein the thermoplastic resin a polybutylene terephthalate.

8. A composition of claim 1, wherein thermoplastic resin is a polyester-polycarbonate other than said polycarbonate.

* * * * *